United States Patent
Kitamura et al.

(10) Patent No.: US 7,700,060 B2
(45) Date of Patent: Apr. 20, 2010

(54) YTTRIA THERMAL SPRAY POWDER AND METHOD FOR FORMING A THERMAL SPRAY COATING

(75) Inventors: Junya Kitamura, Kakamigahara (JP); Hiroyuki Ibe, Kakamigahara (JP)

(73) Assignee: Fujimi Incorporated, Kiyosu-Shi, Aichi (JP)

( * ) Notice: Subject to any disclaimer, the term of this patent is extended or adjusted under 35 U.S.C. 154(b) by 583 days.

(21) Appl. No.: 11/591,764

(22) Filed: Nov. 2, 2006

(65) Prior Publication Data

US 2007/0116885 A1   May 24, 2007

(30) Foreign Application Priority Data

Nov. 2, 2005   (JP) .............................. 2005-320116

(51) Int. Cl.
*C01F 17/00* (2006.01)
(52) U.S. Cl. ........................ 423/263; 501/126; 501/152; 428/688; 427/446
(58) Field of Classification Search ................. 423/263; 427/446, 453; 428/357, 402, 688; 501/126, 501/152

See application file for complete search history.

(56) References Cited

U.S. PATENT DOCUMENTS

| | | | |
|---|---|---|---|
| 6,576,354 B2 | 6/2003 | Tsukatani et al. | 428/702 |
| 6,596,397 B2 | 7/2003 | Kaneyoshi et al. | 428/402 |
| 6,685,991 B2 | 2/2004 | Wataya et al. | 427/446 |
| 6,733,843 B2 | 5/2004 | Tsukatani et al. | 427/453 |
| 6,767,636 B2 | 7/2004 | Takai et al. | 428/402 |
| 6,852,433 B2 | 2/2005 | Maeda | 428/697 |
| 6,916,534 B2 | 7/2005 | Wataya et al. | 428/402 |
| 2007/0077363 A1* | 4/2007 | Kitamura et al. | 427/446 |

FOREIGN PATENT DOCUMENTS

JP      2002-080954      3/2002

* cited by examiner

*Primary Examiner*—Steven Bos
(74) *Attorney, Agent, or Firm*—Vidas, Arrett & Steinkraus, P.A.

(57) ABSTRACT

A thermal spray powder contains granulated and sintered yttria particles and fine yttria particles, the average particle diameter of the fine yttria particles being no more than 1 μm. The content of the fine yttria particles in the thermal spray powder is 1,000 to 10,000 ppm by mass. It is preferred that the thermal spray powder be used in applications for forming a thermal spray coating by plasma thermal spraying at atmospheric pressure.

5 Claims, No Drawings

YTTRIA THERMAL SPRAY POWDER AND METHOD FOR FORMING A THERMAL SPRAY COATING

BACKGROUND OF THE INVENTION

The present invention relates to a thermal spray powder containing granulated and sintered yttria particles and a method for forming a thermal spray coating obtained by using such thermal spray powder.

In the field of manufacturing of semiconductor devices and liquid crystal devices, the microfabrication of the devices is performed by dry etching using plasma. There have been known techniques which involve providing a thermal spray coating in portions of semiconductor device manufacturing equipment and liquid crystal device manufacturing equipment which may be subjected to etching damage by plasma during the plasma process, whereby the plasma etching resistance of these portions is improved (refer to Japanese Laid-Open Patent Publication No. 2002-80954, for example). By improving the plasma etching resistance in this manner, the scattering of particles is suppressed, resulting in an improvement in the yield of devices.

A thermal spray coating used in such applications can be formed by plasma thermal spraying of a thermal spray powder containing, for example, granulated and sintered yttria particles. Although development of thermal spray powders aimed to improve the plasma etching resistance of thermal spray coatings has been carried out, a thermal spray powder capable of meeting required performance has not been obtained as of yet.

SUMMARY OF THE INVENTION

The object of the present invention is to provide a thermal spray powder suitable for the formation of a thermal spray coating excellent in plasma etching resistance and a method for forming a thermal spray coating.

To achieve the above object, the present invention provides a thermal spray power containing granulated and sintered yttria particles and fine yttria particles, the average particle diameter of the fine yttria particles being no more than 1 µm. The content of the fine yttria particles in the thermal spray powder is 1,000 to 10,000 ppm by mass.

The present invention provides also a method for forming a thermal spray coating. The method includes forming a thermal spray coating by plasma thermal spraying of the above-described thermal spray powder at atmospheric pressure.

DETAILED DESCRIPTION OF THE PREFERRED EMBODIMENTS

An embodiment of the present invention will be described below.

A thermal spray powder according to this embodiment is prepared by mixing fine yttria particles with granulated and sintered yttria particles and is essentially comprised of granulated and sintered yttria particles and fine yttria particles. In the thermal spray powder, the fine yttria particles are present in a condition in which they adhere electrostatically to the surfaces of the granulated and sintered yttria particles, i.e., in a condition in which they are adsorbed physically to the surfaces of the granulated and sintered yttria particles. The granulated and sintered yttria particles are prepared by the granulation-sintering process, and in the granulated and sintered yttria particles, primary particles are strongly bonded together mainly by chemical bonds.

In the granulation-sintering process, a granulated powder is first prepared from a raw material powder, and the granulated powder is sintered and broken into smaller particles, and further classified as required, whereby granulated and sintered particles are prepared. The raw material powder may be an yttria powder or a powder of a substance which can be eventually converted into yttria in the processes of granulation and sintering, such as an yttrium powder, an yttrium hydroxide powder, and a mixture of these powders and an yttria powder.

It is preferred that the average particle diameter of the raw material powder be 0.01 to 8 µm or so. The preparation of the granulated powder from the raw material powder may be performed by spray-granulating a slurry obtained by mixing the raw material powder with an appropriate dispersant and adding a binder as required, or it may be performed by tumbling-granulating or compression-granulating to directly prepare the granulated powder from the raw material powder. Although the sintering of the granulated powder may be performed in any of atmospheric air, a vacuum or an inert gas atmosphere, it is preferable to perform this in atmospheric air in terms of the conversion of yttrium in the raw material powder into yttria. An electric furnace or a gas furnace can be used in the sintering of the granulated powder. The sintering temperature is preferably 1,200 to 1,700° C., more preferably 1,300 to 1,700° C. The time for which a maximum temperature is held during sintering is preferably 30 minutes to 10 hours, more preferably 1 to 5 hours.

In a case where the average particle diameter of the granulated and sintered yttria particles contained in the thermal spray powder is less than 20 µm, in a further case where the average particle diameter is less than 22 µm, in another case where the average particle diameter is less than 25 µm, and in an additional case where the average particle diameter is less than 28 µm, there is a concern that relatively fine particles may be contained in the granulated and sintered yttria particles, resulting in a concern that a thermal spray powder having good flowability may not be obtained. Therefore, for an improvement in the flowability of the thermal spray powder, the average particle diameter of the granulated and sintered yttria particles contained in the thermal spray powder is preferably no less than 20 µm, more preferably no less than 22 µm, still more preferably no less than 25 µm, and most preferably no less than 28 µm. Incidentally, as the flowability of the thermal spray powder decreases, the supply of the thermal spray powder to a thermal spray flame tends to become unstable, with the result that the plasma etching resistance of a thermal spray coating tends to become nonuniform. The etching of a thermal spray coating by plasma proceeds preferentially from portions of the thermal spray coating having low plasma etching resistance and, therefore, a thermal spray coating having nonuniform plasma etching resistance has a tendency to be inferior in plasma etching resistance.

On the other hand, in a case where the average particle diameter of the granulated and sintered yttria particles contained in the thermal spray powder exceeds 60 µm, in a further case where the average particle diameter exceeds 57 µm, in another case where the average particle diameter exceeds 55 µm, and in an additional case where the average particle diameter exceeds 52 µm, there is a concern that the granulated and sintered yttria particles may not be sufficiently softened or melted with ease by a thermal spray flame, resulting in a concern that the deposit efficiency of the thermal spray powder may decrease. Therefore, for an improvement in the deposit efficiency, the average particle diameter of the granulated and sintered yttria particles contained in the thermal spray powder is preferably no more than 60 µm, more preferably no more than 57 μm, still more preferably no more than 55 μm, and most preferably no more than 52 μm.

In order to obtain a thermal spray coating excellent in plasma etching resistance, it is essential that the average particle diameter of the fine yttria particles contained in the thermal spray powder be no more than 1 μm. In a case where the average particle diameter exceeds 1 μm, the electrostatic adhesion of the fine yttria particles to the surfaces of the granulated and sintered yttria particles becomes less tend to occur and, therefore, an improvement in the flowability of the thermal spray powder due to the electrostatic adhesion of the fine yttria particles to the surfaces of the granulated and sintered yttria particles is scarcely observed. For this reason, there is a great concern that a thermal spray powder excellent in good flowability may not be obtained and there is a great concern that the plasma etching resistance of a thermal spray coating may become nonuniform. Also, in a case where the average particle diameter of the fine yttria particles contained in the thermal spray powder exceeds 1 μm, a layer which comes from fine yttria particles and which bonds lamellas together in a thermal spray coating showing a lamellar structure tends to become nonuniform, with the result that an increase in the bonds between the lamellas due to a layer coming from fine yttria particles is scarcely observed. Therefore, it is difficult to obtain a thermal spray coating excellent in plasma etching resistance.

In a case where the average particle diameter of the fine yttria particles contained in the thermal spray powder exceeds 0.6 μm and in a further case where the average particle diameter exceeds 0.4 μm, the flowability of the thermal spray powder is not improved much even when the average particle diameter is no more than 1 μm, resulting in a concern that the plasma etching resistance of a thermal spray coating may decrease a little. Therefore, for a further improvement in the plasma etching resistance of a thermal spray coating, the average particle diameter of the fine yttria particles contained in the thermal spray powder is preferably no more than 0.6 μm and more preferably no more than 0.4 μm.

In order to obtain a thermal spray coating excellent in plasma etching resistance, it is essential that the content of the fine yttria particles in the thermal spray powder be no less than 1,000 ppm by mass. In a case where the content of the fine yttria particles is less than 1,000 ppm by mass, because of too low the content of the fine yttria particles in the thermal spray powder, an improvement in the flowability of the thermal spray powder due to the electrostatic adhesion of the fine yttria particles to the surfaces of the granulated and sintered yttria particles is scarcely observed. For this reason, there is a great concern that a thermal spray powder excellent in good flowability may not be obtained and there is a great concern that the plasma etching resistance of a thermal spray coating may become nonuniform. Also, in a case where the content of the fine yttria particles in the thermal spray powder is less than 1,000 ppm by mass, similarly because of too low the content of the fine yttria particles in the thermal spray powder, an increase in the bonds between the lamellas in a thermal spray coating due to fine yttria particles is scarcely observed. Therefore, it is difficult to obtain a thermal spray coating excellent in plasma etching resistance.

In a case where the content of the fine yttria particles in the thermal spray powder is less than 1,300 ppm by mass and in a further case where the content of the fine yttria particles is less than 1,500 ppm by mass, the flowability of the thermal spray powder is not improved much even when the content of the fine yttria particles is no less than 1,000 ppm by mass, resulting in a concern that the plasma etching resistance of a thermal spray coating may decrease a little. Therefore, for a further improvement in the plasma etching resistance of a thermal spray coating, the content of the fine yttria particles in the thermal spray powder is preferably no less than 1,300 ppm by mass, and more preferably no less than 1,500 ppm by mass.

In order to obtain a thermal spray coating excellent in plasma etching resistance, it is also essential that the content of the fine yttria particles in the thermal spray powder be no more than 10,000 ppm by mass. In a case where the content of the fine yttria particles exceeds 10,000 ppm by mass, fine yttria particles which are present in a liberated state without adhering electrostatically to the surfaces of the granulated and sintered yttria particles increase. The fine yttria particles which are present in a liberated state without adhering electrostatically to the surfaces of the granulated and sintered yttria particles coalesce with each other, causing a decrease in the flowability of the thermal spray powder. Also, if fine yttria particles which coalesce with each other become mixed into a thermal spray coating, the plasma etching resistance of the thermal spray coating is reduced also by the mixing of the fine yttria particles. Therefore, when the content of the fine yttria particles in the thermal spray powder exceeds 10,000 ppm by mass, it is difficult to obtain a thermal spray coating excellent in plasma etching resistance.

In a case where the content of the fine yttria particles in the thermal spray powder exceeds 9,000 ppm by mass and in a further case where the content of the fine yttria particles exceeds 8,000 ppm by mass, the flowability of the thermal spray powder decreases a little even when the content of the fine yttria particles is no more than 10,000 ppm by mass, resulting in a concern that the plasma etching resistance of a thermal spray coating may decrease a little. Therefore, for a further improvement in the plasma etching resistance of a thermal spray coating, the content of the fine yttria particles in the thermal spray coating is preferably no more than 9,000 ppm by mass, and more preferably no more than 8,000 ppm by mass.

In a case where the angle of repose of the thermal spray powder exceeds 40 degrees, in a further case where the angle of repose exceeds 38 degrees, and in another case where the angle of repose exceeds 36 degrees, there is a concern that a thermal spray powder having good flowability may not be obtained. Therefore, for an improvement in the flowability of the thermal spray powder, the angle of repose of the thermal spray powder is preferably no more than 40 degrees, more preferably no more than 38 degrees, and most preferably no more than 36 degrees. Incidentally, as described above, as the flowability of the thermal spray powder decreases, the supply of the thermal spray powder to a thermal spray flame tends to become unstable, with the result that the plasma etching resistance of a thermal spray coating tends to become nonuniform.

When the bulk specific gravity of the thermal spray powder is less than 1, it is difficult to obtain a thermal spray coating having a high denseness. Therefore, for an improvement in the denseness of the thermal spray coating, it is preferred that the bulk specific gravity be no less than 1. Incidentally, a thermal spray coating having a low denseness has a high porosity. The etching of a thermal spray coating by plasma proceeds preferentially also from areas around pores in the thermal spray coating and, therefore, a thermal spray coating having a high porosity has a tendency to be inferior in plasma etching resistance.

Although the upper limit to the bulk specific gravity of the thermal spray powder is not specially limited, from the standpoint of practicality, it is preferred that the bulk specific gravity of the thermal spray powder be no more than 3.0.

The thermal spray powder of this embodiment is used in applications for forming a thermal spray coating by plasma thermal spraying or other thermal spraying methods. The pressure of the atmosphere in which the thermal spray powder is plasma thermal sprayed is preferably atmospheric pressure. In other words, it is preferred that the thermal spray powder be used in applications for plasma thermal spraying at atmospheric pressure. When the pressure of the atmosphere during plasma thermal spraying is not atmospheric pressure, particularly in the case of an atmosphere under a reduced pressure, there is a concern that the plasma etching resistance of a thermal spray coating which is obtained may decrease a little. When the thermal spray powder is plasma thermal sprayed under a reduced pressure, there is a concern that the reduction of the yttria in the thermal spray powder may occur during the thermal spraying, resulting in a concern that lattice defects caused by the deficiency of oxygen tends to be contained in the thermal spray coating. The etching of a thermal spray coating by plasma proceeds preferentially also from defect portions in the thermal spray coating and, therefore, a thermal spray coating formed by plasma thermal spraying under a reduced pressure has a tendency to be inferior to a thermal spray coating formed by plasma thermal spraying under an atmospheric pressure in plasma etching resistance.

This embodiment has the following advantages.

The thermal spray powder of this embodiment contains granulated and sintered yttria particles and fine yttria particles, the average particle diameter of the fine yttria particles is set at no more than 1 μm, and the content of the fine yttria particles in the thermal spray powder is set at 1,000 to 10,000 ppm by mass. For this reason, the flowability of the thermal spray powder is effectively improved by the electrostatic adhesion of the fine yttria particles to the surfaces of the granulated and sintered yttria particles, with the result that the plasma etching resistance of a thermal spray coating is made uniform and that the plasma etching resistance of the thermal spray coating is improved. Also, the bonds between the lamellas in the thermal spray coating are effectively increased due to fine yttria particles, with the result that the plasma etching resistance of the thermal spray coating is improved. Therefore, a thermal spray coating formed from the thermal spray powder of this embodiment is excellent in plasma etching resistance. In other words, the thermal spray powder of this embodiment is suitable for the formation of a thermal spray coating excellent in plasma etching resistance.

The above-described embodiment may be modified as follows.

The thermal spray powder may contain components other than granulated and sintered yttria particles and fine yttria particles. However, it is preferred that the amounts of the components contained in the thermal spray powder other than granulated and sintered yttria particles and fine yttria particles be as little as possible.

The granulated and sintered yttria particles and fine yttria particles contained in the thermal spray powder may contain components other than yttria. However, the content of yttria in the granulated and sintered yttria particles and the content of yttria in the fine yttria particles are preferably no less than 90%, more preferably no less than 95%, and most preferably no less than 99%. Although the components other than yttria in the granulated and sintered yttria particles and the components other than yttria in the fine yttria particles are not especially limited, it is preferred that these components be rare earth oxides.

Next, the present invention will be more concretely described by citing examples and comparative examples.

Thermal spray powders of Examples 1 to 10 and Comparative Examples 1 to 3 were prepared by mixing fine yttria particles with granulated and sintered yttria particles. And a thermal spray coating was formed by plasma thermal spraying each of the thermal spray powders. Details of the thermal spray powders and thermal spray coatings are as shown in Table 1. The thermal spraying conditions (conditions for plasma thermal spraying at atmospheric pressure and conditions for plasma thermal spraying under a reduced pressure) used in forming the thermal spray coatings are shown in Table 2.

The column entitled "Content of fine yttria particles" in Table 1 shows the content of the fine yttria particles in each of the thermal spray powders.

The column entitled "Average particle diameter of fine yttria particles" in Table 1 shows the average particle diameter of the fine yttria particles contained in each of the thermal spray powders, which was measured by use of a laser diffraction/scattering particle size measuring apparatus "LA-300" made by Horiba, Ltd.

The column entitled "Average particle diameter of granulated and sintered yttria particles" in Table 1 shows the average particle diameter of the granulated and sintered yttria particles contained in each of the thermal spray powders, which was measured by use of a laser diffraction/scattering particle size measuring apparatus "LA-300" made by Horiba, Ltd.

The column entitled "Angle of repose" in Table 1 shows the angle of repose of each of the thermal spray powders, which was measured by use of an ABD-powder characteristic measuring instrument "ABD-72 model" made by Tsutsui Rikagaku Co., Ltd.

The column entitled "Bulk specific gravity" in Table 1 shows the bulk specific gravity of each of the thermal spray powders, which was measured in accordance with JIS Z2504.

The column entitled "Thermal spraying atmosphere" in Table 1 shows the pressure of an atmosphere used in the plasma thermal spraying of each of the thermal spray powders to form a thermal spray coating.

The column entitled "Deposit efficiency" in Table 1 shows results for an evaluation of the deposit efficiency, which is the ratio of the weight of a thermal spray coating formed by the thermal spraying of each of the thermal spray powders to the weight of the thermal spray powder used in thermal spraying. In the column, the numeral 1 (Excellent) denotes that the deposit efficiency was no less than 50%, the numeral 2 (Good) denotes that the deposit efficiency was no less than 45% but less than 50%, and the numeral 3 (NG) denotes that the deposit efficiency was less than 45%.

The column entitled "Denseness" in Table 1 shows results for an evaluation of the denseness of a thermal spray coating formed by the thermal spraying of each of the thermal spray powders. Concretely, first, each of the thermal spray coatings was cut at a plane orthogonal to a top surface of the thermal spray coating, and the cut surface was mirror polished by use of colloidal silica having an average particle diameter of 0.06 μm. After that, the porosity on the cut surface of the thermal spray coating was measured by use of an image analysis processing device "NSFJ1-A" of N-Support Corp. In the column entitled "Denseness", the numeral 1 (Excellent) denotes that the porosity was less than 6%, the numeral 2 (Good) denotes that the porosity was no less than 6% but less than 12%, and the numeral 3 (NG) denotes that the porosity was no less than 12%.

The column entitled "Plasma etching resistance" in Table 1 shows results for an evaluation of the plasma etching resistance of thermal spray coatings formed by the thermal spraying of each of the thermal spray powders. Concretely, first, the surface of each of the thermal spray coatings was mirror polished by use of colloidal silica having an average particle diameter of 0.06 μm. Part of the surface of the thermal spray coating after the polishing was masked with polyimide tape and the whole surface of the thermal spray coating was then plasma etched under the conditions shown in Table 3. After that, the height of a step between a masked portion and a nonmasked portion was measured by use of a step measuring device "Alpha-Step" of KLA-Tencor Corporation. In the column entitled "Plasma etching resistance", the numeral 1 (Excellent) denotes that the etching rate calculated by dividing the height of a step by etching time was less than 40 nm/minute, the numeral 2 (Good) denotes that the etching rate was no less than 40 nm/minute but less than 50 nm/minute, and the numeral 3 (NG) denotes that the etching rate was no less than 50 nm/minute.

TABLE 3

Etching device: Reactive ion etching device "NLD-800" of ULVAC, Inc.
Etching gas: $CF_4$
Etching gas flow rate: 0.054 l/minute
Chamber pressure: 1 Pa
Plasma output: 800 W
Etching time: 1 hour As shown in Table 1, in the thermal spray coatings of Examples 1 to 10, results are obtained that are satisfactory with respect to plasma etching resistance in terms of practical use. In contrast to this, in the thermal spray coatings of Comparative Examples 1 to 3, results are not obtained that are satisfactory with respect to plasma etching resistance in terms of practical use.

TABLE 1

| | Content of fine yttria particles [ppm by mass] | Average particle diameter of fine yttria particles [μm] | Average particle diameter of granulated and sintered yttria particles [μm] | Angle of repose [degree] | Bulk specific gravity | Thermal spraying atmosphere | Deposit efficiency | Denseness | Plasma etching resistance |
|---|---|---|---|---|---|---|---|---|---|
| Comparative Example 1 | 800 | 0.06 | 45 | 42 | 1.1 | Atmospheric air | 1 | 1 | 3 |
| Example 1 | 1200 | 0.06 | 45 | 40 | 1.2 | Atmospheric air | 1 | 1 | 2 |
| Example 2 | 1000 | 0.06 | 45 | 38 | 1.3 | Atmospheric air | 1 | 1 | 1 |
| Example 3 | 5000 | 0.06 | 45 | 34 | 1.3 | Atmospheric air | 1 | 1 | 1 |
| Example 4 | 5000 | 0.80 | 45 | 38 | 1.2 | Atmospheric air | 1 | 1 | 2 |
| Comparative Example 2 | 5000 | 1.10 | 45 | 41 | 1.2 | Atmospheric air | 1 | 2 | 3 |
| Example 5 | 8000 | 0.06 | 45 | 32 | 1.3 | Atmospheric air | 1 | 1 | 2 |
| Comparative Example 3 | 12000 | 0.06 | 45 | 32 | 1.4 | Atmospheric air | 1 | 1 | 3 |
| Example 6 | 5000 | 0.06 | 22 | 40 | 1.0 | Atmospheric air | 1 | 1 | 1 |
| Example 7 | 5000 | 0.06 | 17 | 45 | 0.9 | Atmospheric air | 1 | 1 | 2 |
| Example 8 | 5000 | 0.06 | 52 | 39 | 1.3 | Atmospheric air | 2 | 2 | 1 |
| Example 9 | 5000 | 0.06 | 62 | 39 | 1.3 | Atmospheric air | 2 | 2 | 2 |
| Example 10 | 5000 | 0.06 | 45 | 34 | 1.3 | Reduced pressure | 1 | 1 | 2 |

TABLE 2

Conditions for plasma thermal spraying at atmospheric pressure

Base material: Al alloy sheet (A6061)(50 mm × 75 mm × 5 mm) subjected to blasting treatment by use of brown alumina abrasives (A#40)
Thermal spray machine: "SG-100" made by Praxair
Powder supply machine: "Model 1264" made by Praxair
Ar gas pressure: 50 psi (0.34 MPa)
He gas pressure: 50 psi (0.34 MPa)
Voltage: 37.0 V
Current: 900 A
Thermal spraying distance: 120 mm
Thermal spray powder feed rate: 20 g/minute Conditions for plasma thermal spraying under a reduced pressure Base material: Al alloy sheet (A6061)(50 mm × 75 mm × 5 mm) subjected to blasting treatment by use of brown alumina abrasives (A#40)
Thermal spray machine: "F4" made by Sulzer-Metco
Powder supply machine: "Twin 10" made by Sulzer-Metco
Ar gas flow rate: 42 l/minute
He gas flow rate: 10 l/minute
Voltage: 43.0 V
Current: 620 A
Thermal spraying distance: 200 mm
Thermal spray powder feed rate: 20 g/minute

The invention claimed is:

1. A thermal spray powder comprising granulated and sintered yttria particles and fine yttria particles, the average particle diameter of the fine yttria particles being no more than 1 μm, wherein the content of the fine yttria particles in the thermal spray powder is 1,000 to 10,000 ppm by mass.

2. The thermal spray powder according to claim 1, wherein the average particle diameter of the granulated and sintered yttria particles is 20 to 60 μm.

3. The thermal spray powder according to claim 1, wherein the angle of repose of the thermal spray powder is no more than 40 degrees.

4. The thermal spray powder according to claim 1, wherein the bulk specific gravity of the thermal spray powder is no less than 1.

5. A method for forming a thermal spray coating, comprising forming a thermal spray coating by plasma thermal spraying of a thermal spray powder at atmospheric pressure, wherein the thermal spray powder contains granulated and sintered yttria particles and fine yttria particles, the average particle diameter of the fine yttria particles being no more than 1 μm, the content of the fine yttria particles in the thermal spray powder being 1,000 to 10,000 ppm by mass.

* * * * *